(12) United States Patent
Abe et al.

(10) Patent No.: US 9,802,397 B2
(45) Date of Patent: Oct. 31, 2017

(54) STRUCTURAL MEMBER FOR ELECTRONIC DEVICES

(71) Applicant: PANASONIC INTELLECTUAL PROPERTY MANAGEMENT CO., LTD., Osaka (JP)

(72) Inventors: Takatoshi Abe, Osaka (JP); Tomoaki Sawada, Osaka (JP); Shingo Yoshioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/925,048

(22) Filed: Oct. 28, 2015

(65) Prior Publication Data
US 2016/0152016 A1 Jun. 2, 2016

(30) Foreign Application Priority Data
Nov. 27, 2014 (JP) .................. 2014-239898

(51) Int. Cl.
*B32B 27/36* (2006.01)
*C08L 71/02* (2006.01)
(Continued)

(52) U.S. Cl.
CPC .............. *B32B 27/36* (2013.01); *B32B 27/38* (2013.01); *C08G 59/245* (2013.01); *C08G 59/56* (2013.01); *C08L 63/00* (2013.01); *C08L 71/02* (2013.01); *B32B 3/08* (2013.01); *B32B 3/30* (2013.01); *B32B 7/045* (2013.01); *B32B 27/08* (2013.01); *B32B 27/20* (2013.01); *B32B 2305/77* (2013.01); *B32B 2307/202* (2013.01); *B32B 2307/21* (2013.01); *B32B 2307/50* (2013.01); *B32B 2307/51* (2013.01);
(Continued)

(58) Field of Classification Search
None
See application file for complete search history.

(56) References Cited

U.S. PATENT DOCUMENTS

2003/0138398 A1   7/2003   Okumura et al.
2006/0038182 A1   2/2006   Rogers et al.
(Continued)

FOREIGN PATENT DOCUMENTS

EP   2 497 789       9/2012
JP   2002-339205    11/2002
(Continued)

*Primary Examiner* — David Sample
*Assistant Examiner* — Donald M Flores, Jr.
(74) *Attorney, Agent, or Firm* — Greenblum & Bernstein, P.L.C.

(57) ABSTRACT

Provided is a structural member for electronic devices which uses a material that is flexible and has excellent restoration properties after extension and stress relaxation properties. The structural member for electronic devices has the following properties A and B: (Property A) In a case where predetermined deformation is applied, stress that applies the deformation is relaxed (reduced) with time: and (Property B) In a case where the stress that applies deformation is 0, the deformation rarely remains while a resin composition is recovered. That is, when stress is 0, residual strain substantially becomes 0 (specifically 3% or lower).

14 Claims, 4 Drawing Sheets

(51) Int. Cl.
  B32B 3/08    (2006.01)
  C08G 59/24   (2006.01)
  C08G 59/56   (2006.01)
  B32B 27/38   (2006.01)
  C08L 3/02    (2006.01)
  C08L 63/00   (2006.01)
  B32B 7/04    (2006.01)
  B32B 27/08   (2006.01)
  B32B 27/20   (2006.01)
  B32B 3/30    (2006.01)

(52) U.S. Cl.
  CPC ... *B32B 2307/546* (2013.01); *B32B 2307/552* (2013.01); *B32B 2307/734* (2013.01); *B32B 2457/00* (2013.01); *B32B 2457/20* (2013.01); *B32B 2571/00* (2013.01)

(56) References Cited

U.S. PATENT DOCUMENTS

| | | |
|---|---|---|
| 2006/0286785 A1 | 12/2006 | Rogers et al. |
| 2007/0032089 A1 | 2/2007 | Nuzzo et al. |
| 2008/0097039 A1 | 4/2008 | Ito et al. |
| 2008/0143906 A1 | 6/2008 | Allemand et al. |
| 2008/0157235 A1 | 7/2008 | Rogers et al. |
| 2008/0259262 A1 | 10/2008 | Jones et al. |
| 2009/0079322 A1 | 3/2009 | Tsutsumi et al. |
| 2009/0088546 A1 | 4/2009 | Ito et al. |
| 2009/0199960 A1 | 8/2009 | Nuzzo et al. |
| 2009/0294803 A1 | 12/2009 | Nuzzo et al. |
| 2009/0321113 A1 | 12/2009 | Allemand et al. |
| 2009/0321364 A1 | 12/2009 | Spaid et al. |
| 2010/0059863 A1 | 3/2010 | Rogers et al. |
| 2010/0072577 A1 | 3/2010 | Nuzzo et al. |
| 2010/0129677 A1* | 5/2010 | Ito .............. B05D 7/14  428/532 |
| 2010/0243295 A1 | 9/2010 | Allemand et al. |
| 2010/0247810 A1 | 9/2010 | Yukinobu et al. |
| 2010/0289124 A1 | 11/2010 | Nuzzo et al. |
| 2011/0088770 A1 | 4/2011 | Allemand et al. |
| 2011/0148800 A1* | 6/2011 | Nishikawa ........ B32B 7/12  345/173 |
| 2011/0220890 A1 | 9/2011 | Nuzzo et al. |
| 2011/0297642 A1 | 12/2011 | Allemand et al. |
| 2012/0033367 A1 | 2/2012 | Jones et al. |
| 2012/0083099 A1 | 4/2012 | Nuzzo et al. |
| 2012/0220728 A1 | 8/2012 | Uekusa et al. |
| 2012/0327608 A1 | 12/2012 | Rogers et al. |
| 2013/0057138 A1 | 3/2013 | Tsutsumi et al. |
| 2013/0100618 A1 | 4/2013 | Rogers et al. |
| 2013/0320503 A1 | 12/2013 | Nuzzo et al. |
| 2014/0191236 A1 | 7/2014 | Nuzzo et al. |
| 2014/0338735 A1 | 11/2014 | Allemand et al. |
| 2014/0374872 A1 | 12/2014 | Rogers et al. |
| 2015/0001462 A1 | 1/2015 | Rogers et al. |

FOREIGN PATENT DOCUMENTS

| | | |
|---|---|---|
| JP | 2003-113561 | 4/2003 |
| JP | 2009-163959 | 7/2009 |
| JP | 2010-507199 | 3/2010 |
| JP | 2012-027488 | 2/2012 |
| JP | 2012-063437 | 3/2012 |
| JP | 2014-017495 | 1/2014 |
| WO | 2008/046058 | 4/2008 |
| WO | 2008/131304 | 10/2008 |
| WO | 2009/017852 | 2/2009 |
| WO | 2011/106438 | 9/2011 |

* cited by examiner

FIG. 6

STRUCTURAL MEMBER FOR ELECTRONIC DEVICES

BACKGROUND OF THE INVENTION

1. Field of the Invention

The present invention relates to a structural member for electronic devices, which uses a resin composition having high tensile stress relaxation properties and excellent restoration properties after extension.

2. Description of the Related Art

A thermosetting resin has been used in a wide range of fields such as electronic materials and optical materials due to its excellent heat resistance, chemical resistance, moldability, insulation reliability, and the like. Particularly, as the thermosetting resin, an epoxy resin is widely used for various purposes. However, it is also known that the epoxy resin is generally hard and has insufficient flexibility although the above-mentioned properties are excellent. Therefore, the epoxy resin may be deformed or broken due to stress or heat stress from the outside.

As a material having more excellent flexibility, there are thermoplastic resins such as polyethylene or various rubber materials as well as a silicone resin or urethane resin. In addition, regarding the flexibility of the resin material, a low elastic modulus, high tensile extension, and high restoration properties after extension are also necessary for use in various members.

For example, the development of a flexible display such as electronic paper using such a material having excellent flexibility has progressed. In general, there are a number of types of electronic paper including an electrophoretic type and a twisting-ball type. In any of the types, the electronic paper is formed as a laminate of a display layer for implementing displaying and a conductive layer to which a voltage is applied. In the electrophoretic type flexible display, a urethane resin is mainly used (PTL 1).

On the other hand, in the twisting-ball type, a silicone is used (PTL 2).

In addition, in order to freely deform an electronic device, not only stretchability for an electronic circuit board but also resistance to deforming stress applied to mounted electronic components is necessary. Hitherto, there has been an examination in which a semiconductor element itself is provided with stretchability (PTL 3).

CITATION LIST

Patent Literature

PTL 1: Japanese Patent Unexamined Publication No. 2012-63437
PTL 2: Japanese Patent Unexamined Publication No. 2012-27488
PTL 3: Japanese Patent Unexamined Publication No. 2014-17495

SUMMARY OF THE INVENTION

On the other hand, as properties required of a recent resin material in addition to flexibility, there are stress relaxation properties. High residual stress when stress is added and deformation occurs means that an amount of force required to recover its original shape is high. Therefore, when residual stress is high, peeling between members and breaking may occur. Therefore, to reduce added stress in order to reduce residual stress, that is, excellent stress relaxation properties are also necessary properties.

However, it is known that the urethane resin or silicone as described above in PTL 1 or PTL 2 has low stress relaxation properties although it has high tensile extension and high restoration properties. It is possible to enhance the stress relaxation properties of the urethane resin by changing the types or a combination of a polyol and an isocyanate which are raw materials, or by reducing the cross-link density. However, in this case, the restoration properties may be reduced. In addition, there is also a problem in that the urethane resin has a narrow usable temperature range and low heat resistance, resulting in a limitation on the range of use.

Therefore, a display manufactured by using such a resin has a problem in that peeling or breaking easily occurs due to residual stress when it follows a free-form surface or significantly deforms. Therefore, the flexible display remains in a state of having flexibility to a slight degree.

These problems are similarly applied to other rubber materials, which means that the rubber materials have low stress relaxation properties while having high restoration properties. In addition, although polyethylene or other thermoplastic materials are used in various fields exhibiting their properties including flexibility and high tensile extension, the elastic region of tensile extension is about several % to tens of %, and in a region beyond a yield point, extension accompanied by plastic deformation occurs. Therefore, there is a problem in that the material cannot recover its original shape after extension (has high residual strain ratio) although it has excellent stress relaxation properties.

Creasing as described in PTL 3 allows excellent stretchability in one axial direction but does not allow stretching in multiple axial directions. In addition, there are problems in that extension depends on the crease shapes in a stretchable region, and breaking occurs when extension over the stretchable region occurs. Therefore, when an element manufactured by using the crease shapes undergoes deformation that is not postulated, there is a problem in that the element is more likely to peel or break. Accordingly, the flexible display remains in a state of having flexibility at a slight degree.

The present invention has been made taking the foregoing circumstances into consideration, and an object thereof is to provide a structural member for electronic devices which uses a material that is flexible and has excellent restoration properties after extension and stress relaxation properties.

Here, the inventors extensively studied, and as a result, thought that by allowing high stress relaxation properties during tension and excellent restoration properties after extension, which are conflicting properties, to be compatible with each other, flexibility and restoration even after deformation can be achieved and peeling between members or breaking due to residual stress can be minimized. The inventors repeated examinations on the basis of the findings and completed the present invention.

That is, an aspect of the present invention is a structural member for electronic devices, which uses a resin composition that is elastically deformable and has low residual strain ratio and stress relaxation properties.

In the resin composition used in the structure, it is preferable that in a case where a predetermined magnitude of deformation is applied, stress that applies the deformation decreases with time, and in a case where stress is 0, the resin composition recovers its shape approximately before the deformation.

In the resin composition used in the structure, it is preferable that a stress relaxation ratio R and a residual strain ratio α measured by an extension-restoration test described below satisfy the following expression:

20%≤R≤95%, and

0%≤α≤3%.

Furthermore, it is preferable that in a case where the resin composition is elongated in a range of 15% to 20% in the extension-restoration test, slopes of changes in tensile force during restoration and during extension with respect to strain amount satisfy slope during restoration/slope during extension≤0.95.

In addition, it is preferable that a stress value of the resin composition measured during maximum extension (during 25% extension) in the extension-restoration test becomes the maximum stress value, and in a case where measurement is started simultaneously with the end of an extension process in a stress relaxation property test described below, a tensile force $F_{B0}$ immediately after the end of the extension process and a tensile force $F_B(t30)$ when 30 minutes has elapsed after the end of the extension process satisfy the following expression:

0.1≤$F_B(t30))/F_{B0}$≤0.7.

Furthermore, it is preferable that even when the test is repeatedly performed by using the resin composition two or more times, a behavior in which the above-described expressions are satisfied is exhibited.

Furthermore, it is preferable that the resin composition contains at least a thermosetting resin and a curing agent thereof.

In addition, it is preferable that the thermosetting resin is an epoxy resin.

It is preferable that in the structure, the resin composition has a film form.

Furthermore, it is preferable that the structure has a conductive portion which connects an electronic element to the resin composition.

In addition, it is preferable that the structure has a conductive portion which is electrically connected to the structure from the outside.

Furthermore, it is preferable that in the structure, a portion of the electronic element comes into close contact with the resin composition.

In addition, it is preferable that in the structure, the entirety of the electronic element is covered with the resin composition.

According to the present invention, it is thought that since high stress relaxation properties during tension and excellent restoration properties after extension are compatible with each other, it is possible to provide a structural member for electronic devices which uses the material that is flexible and has excellent stress relaxation properties. In addition, it is possible to provide a flexible display or the like which can follow a free-form surface or can cope with significant deformation by using the structure.

In addition, since the compatibility between high stress relaxation properties and restoration properties is provided, the structure can be applied to, in addition to the flexible display, various technology fields such as optical fields, electronic fields, adhesion fields, and medical fields and is thus very advantageous in industrial applications.

DETAILED DESCRIPTION OF THE PREFERRED EMBODIMENTS

Hereinafter, an exemplary embodiment related to a structural member for electronic devices of the present invention will be described in detail, but the present invention is not limited thereto.

Schematic sectional views of structures for electronics according to examples of the present invention are illustrated in FIGS. 3 to 6. The structural member for electronic devices basically has a configuration in which at least a portion of an electronic element comes in close contact with a resin composition. Details of the structural member for electronic devices will be described later.

First, the resin composition forming the structural member for electronic devices will be described.

[1] EXAMINATION OF RESIN COMPOSITION

A resin composition according to this exemplary embodiment is specifically made of a thermosetting resin film primarily containing an epoxy resin. The composition of the thermosetting resin is as follows.

(Component A) Polyrotaxane

"A1000" manufactured by Advanced Softmaterials Inc., which contains PEG as an axle molecule, α-cyclodextrin as a cyclic molecule, and an OH group as a reactive group.

(Component B) Thermosetting Resin

Epoxy resin ("JER1003" manufactured by Mitsubishi Chemical Corporation, 7 to 8 methyl groups, difunctional, a molecular weight of 1300)

(Component C) Imidazole-Based Curing Accelerator

"2E4MZ" manufactured by Shikoku Chemicals Corporation, 2-ethyl-4-methylimidazole (Component D) Other Additive Components Cross-linking agent: isocyanate, "DN950" manufactured by DIC Corporation The weight ratio of (Component A) to (Component D) is (Component A):(Component B):(Component C):(Component D)=100:100:1.5:45.

(1-1) Examination by Extension-Restoration Test

[Extension-Restoration Test]

In an extension-restoration test used in this exemplary embodiment, a resin composition piece (thickness: 50 μm, sample shape: dumbbell specimen No. 6 (measurement portion width: 4 mm, parallel portion length: 25 mm)) is used, a tensile and compression testing machine based on ISO 3384 (for example, Autograph (type: AGS-X) manufactured by Shimadzu Corporation) is used, an extension process is performed and thereafter a restoration process is performed under the following conditions, and a stress relaxation ratio R and a residual strain ratio α are calculated according to the following calculation method.
(Extension Process Conditions)

In order to remove deflection that occurs when the test piece is attached to a gripper, deflection correction is performed with a force of 0.05 N or lower.

Testing rate: 25 mm/min from 0% to 25% extension
Temperature condition: 23° C.
Extension and holding conditions: a holding time of 5 minutes at 25% extension
(Restoration Process Conditions)
Testing rate: 0.1 mm/min until a tensile force becomes 0±0.05 N
Temperature condition: 23° C.

Stress relaxation ratio calculation method: the tensile force at the time of the end of the extension process is measured and is referred to as an initial tensile force $F_{A0}$. Thereafter, the strain amount is held under the above-described extension and holding conditions and the tensile force is measured after 5 minutes. This is referred to as $F_A(t5)$. The stress relaxation ratio R is calculated by the following expression.

$$R = \frac{F_{A0} - F_A(t5)}{F_{A0}} \times 100 \quad \text{[Expression 1]}$$

Residual strain ratio calculation method: the strain amount is measured at the point in time when the tensile force becomes 0±0.05 N in the restoration process, and is referred to as the residual strain ratio α.

Figure 1:
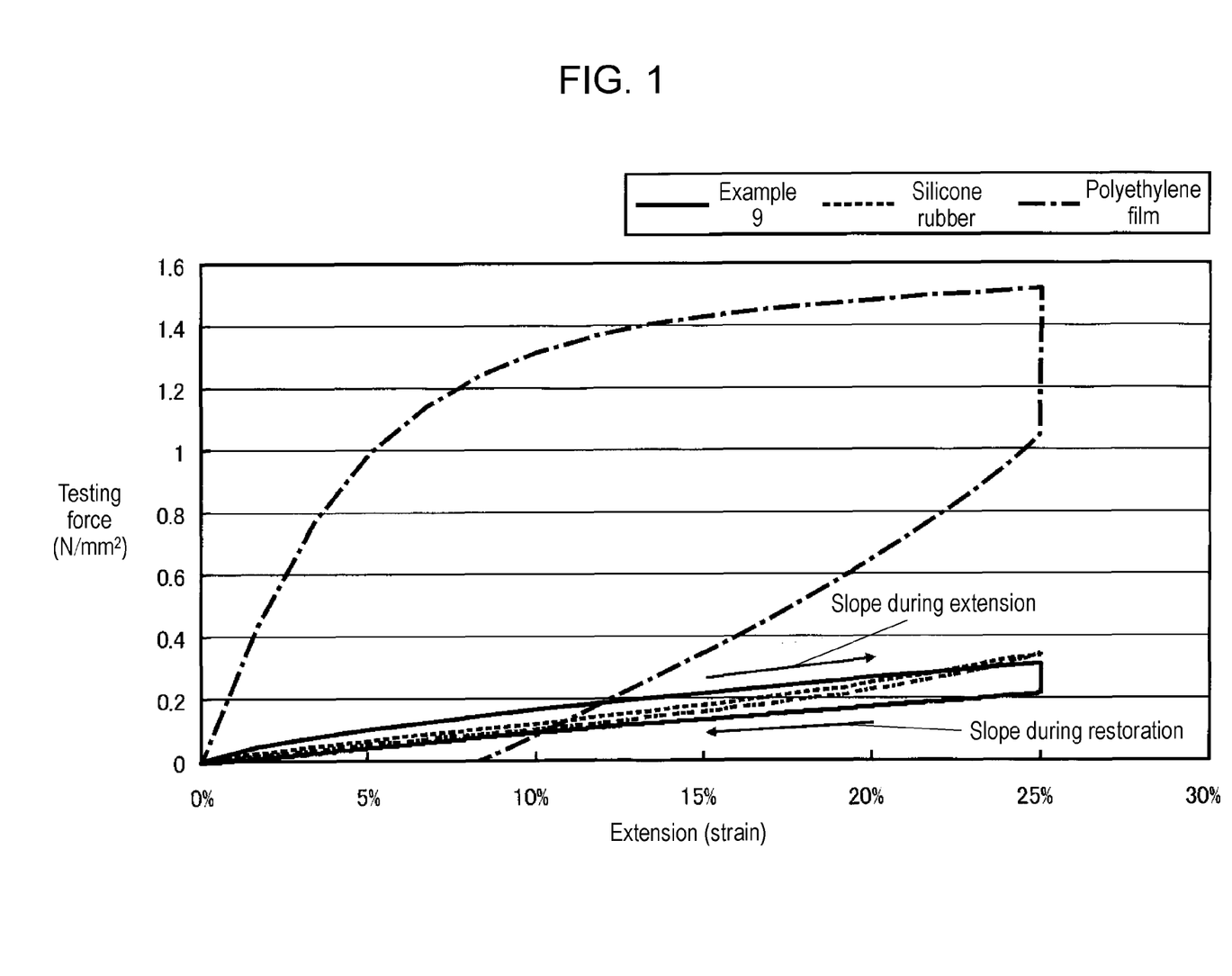
FIG. 1 is a graph showing the behaviors of a resin composition according to an exemplary embodiment of the present invention and resin compositions which are used for comparison in an extension-restoration test.

(1-1a) Behavior of Resin Composition in Case of Performing Extension-Restoration Test In a case of performing the extension-restoration test, the resin composition according to this exemplary embodiment shows extension (strain) and restoration behaviors, for example, as indicated by a curve (approximately straight line) of the graph shown in FIG. 1 with respect to tensile force (testing force). In addition, in FIG. 1, the vertical axis represents the tensile force (N/mm$^2$), and the horizontal axis represents extension (strain) (%). The extension amount described here indicates a substantial strain amount of the resin composition in the specification.

In FIG. 1, for comparison, in a case where the extension-restoration test is performed by using a silicone film which is an elastically deformable resin that has been used in the related art and a polyethylene film which is a plastically deformable resin, the behaviors of the resins are also illustrated. In any case, the upper curves (approximately straight line in the resin composition of this exemplary embodiment) represent extension during the extension process, and the lower curves (approximately straight lines) represent restoration (restoration from extension) during the restoration process.

As illustrated in FIG. 1, the resin composition of this exemplary embodiment is first elongated to 25% by the tensile force during the extension process, is held for 5 minutes in this state to relax stress while being held, and is thereafter recovered during the restoration process until the tensile force becomes 0±0.05 N.

(1-1b) Residual Strain Ratio

The residual strain ratio of the resin composition of this exemplary embodiment is recovered to almost about 1% (that is, the residual strain ratio is very low) even when the resin composition is subjected to the extension-restoration test described above. On the other hand, after the extension-restoration test, the residual strain ratio of the polyethylene film is recovered only to about 8.4% (the residual strain ratio is high).

(1-1c) Stress Relaxation

The stress of the silicone film according to the related art when being held for 5 minutes after the extension process was rarely relaxed in the elongated state.

In addition, the stress of the polyethylene film according to the related art when being held for 5 minutes after the extension process was relaxed by about 30%.

On the other hand, the stress of the resin composition of this exemplary embodiment was relaxed by about 30%.

(1-1d) Advantageous Properties of Resin Composition of this Exemplary Embodiment From the results of (1-1b) and (1-1c), the resin composition of this exemplary embodiment has special and advantageous properties of being excellent in both residual strain and stress relaxation properties, which are not achieved in the related art.

(1-2) Examination by Stress Relaxation Property Test
[Stress Relaxation Property Test]

A resin composition piece (thickness: 50 μm, sample shape: dumbbell specimen No. 6 (measurement portion width: 4 mm, parallel portion length: 25 mm)) is used, an extension process is performed by a tensile and compression testing machine based on ISO 3384 under the following conditions, and the tensile force at the time of the end of the extension is measured and is referred to as an initial tensile force $F_{B0}$. Thereafter, a tensile force $F_B(t30)$ after 30 minutes is measured.

(Extension Process Conditions)

In order to remove deflection that occurs when the test piece is attached to a gripper, deflection correction is performed. The deflection correction is performed with a force of 0.05 N or lower.

Testing rate: 25 mm/min until 50% extension
Temperature condition: 23° C.
Extension and holding conditions: a holding time of 30 minutes at 50% extension In addition, it is preferable that the resin composition of this exemplary embodiment satisfies each of the above-described relationships even when extension and holding operations are repeatedly performed two or more times (that is, even when the sample that recovers its original shape under arbitrary conditions is repeatedly measured after the end of the test performed first) in the stress relaxation property test.

Figure 2:
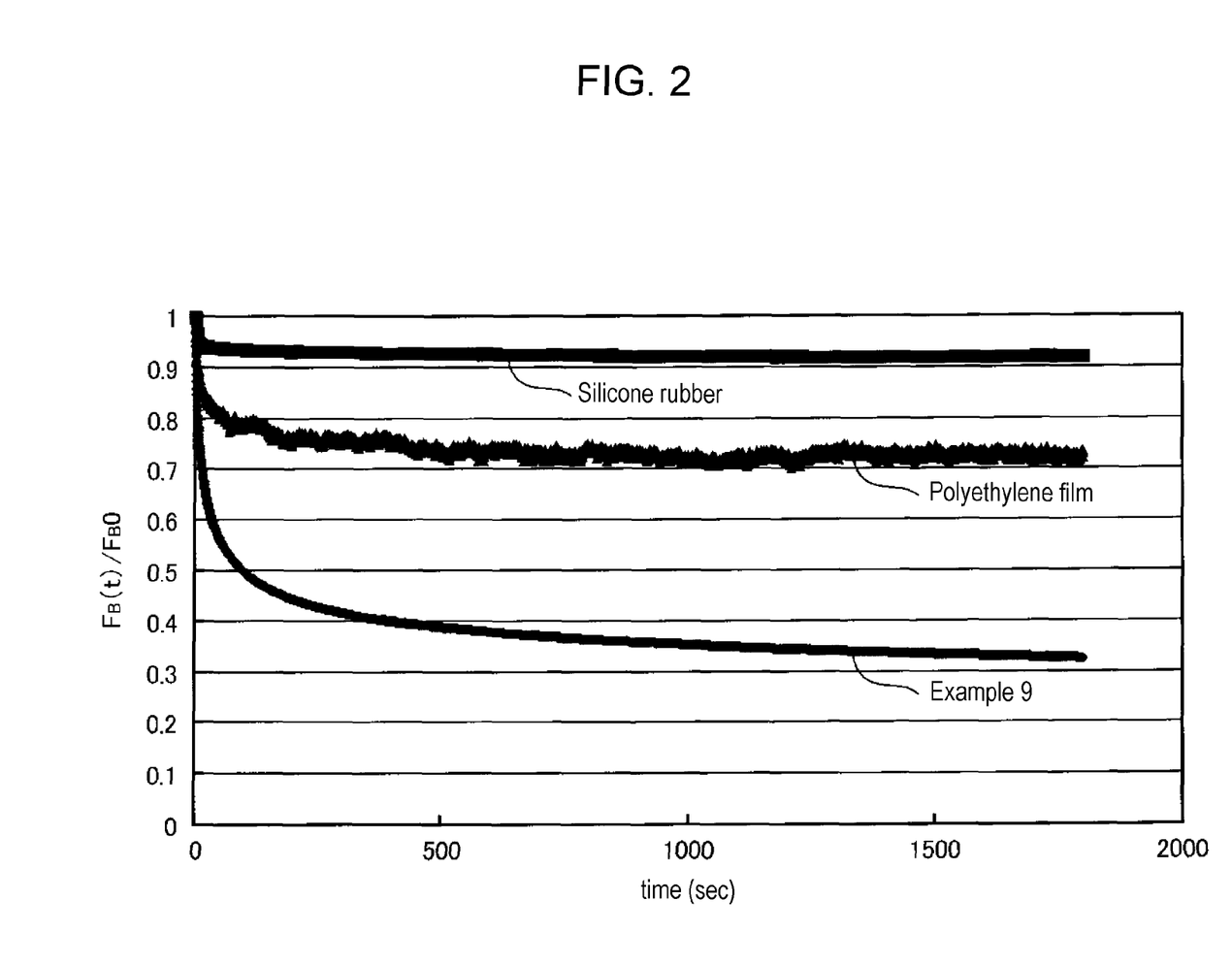
FIG. 2 is a graph showing the behaviors of the resin composition according to the exemplary embodiment of the present invention and the resin compositions which are used for comparison in a stress relaxation property test.

(1-2a) Behavior of Resin Composition in Case of Performing Stress Relaxation Property Test The stress relaxation properties of the resin composition according to this exemplary embodiment in the case of performing the stress relaxation property test are shown in the graph of FIG. 2. In FIG. 2, the graph of the stress relaxation properties of the silicone film and the stress relaxation properties of the polyethylene film in the case of performing the stress relaxation property test is also shown. In FIG. 2, the vertical axis represents ($F_B(t)/F_{B0}$), and the horizontal axis represents time (sec).

(1-2b) Stress Relaxation

As illustrated in FIG. 2, the resin composition of this exemplary embodiment is a material having high restoration properties, and with respect to stress ($F_{B0}$) needed for 50% extension, in a case where the 50%-extension state is maintained, stress needed to hold the elongated state is reduced to ($F_B(t30)$) after 30 minutes, that is, stress can be relaxed by 70%.

Contrary to this, the silicone film which is a resin according to the related art has a stress relaxation ratio of 8% under the same conditions although it has high restoration properties, and the polyethylene film does not have high restoration properties and has a stress relaxation ratio of about 28%. That is, residual stress is as high as the above value.

(1-2c) Advantageous Properties of Resin Composition of this Exemplary Embodiment From the results of (1-1c) and (1-2b), the following can be seen.

In the resin composition of this exemplary embodiment, the stress relaxation after 5 minutes during 25% extension is about 30% while the stress relaxation after 30 minutes during 50% extension is about 70%. That is, it can be seen that the resin composition of this exemplary embodiment has excellent flexibility and reliably relaxes stress.

On the other hand, in the case of the silicone film which is a resin according to the related art, there is no substantial stress relaxation after 5 minutes during 25% extension, and the stress relaxation after 30 minutes during 50% extension is only a value as low as about 8%. That is, it can be seen that in the case of the silicone film, stress relaxation is low.

In the case of the polyethylene film which is a resin according to the related art, the stress relaxation after 5 minutes during 25% extension is about 30%, and the stress relaxation after 30 minutes during 50% extension is about 28% and is thus virtually unchanged. That is, it can be seen that in the case of the polyethylene film, plastic deformation occurs and restoration properties cannot be maintained.

As described above, even by the behavior of the resin composition of this exemplary embodiment as shown in FIGS. 1 and 2, it can be seen that the resin composition of this exemplary embodiment is a resin composition which has excellent flexibility and thus has extremely excellent restoration properties after extension while relaxing stress.

(1-3) Conclusions

The resin composition of this exemplary embodiment has the following properties A and B.

(Property A) In a case where predetermined deformation (strain, extension strain) is applied, stress that applies the deformation is relaxed (reduced) with time.

(Property B) In a case where stress that applies deformation is 0, the deformation rarely remains while the resin composition is recovered. That is, when stress is 0, the residual strain ratio thereof substantially becomes 0 (specifically 3% or lower).

These properties cannot be achieved by the elastically deformable resin or the plastically deformable resin according to the related art, and a structure which uses the resin composition of this exemplary embodiment is an excellent structure capable of exhibiting the properties when being used, for example, in a flexible display.

(1-4) Properties of Preferable Resin Composition

It is preferable that, in the resin composition, the stress relaxation ratio R and the residual strain ratio α measured by the extension-restoration test described above satisfy:

$$20\% \leq R \leq 5\%, \text{ and}$$

$$0\% \leq \alpha \leq 3\%.$$

When R and α are in the ranges, the resin composition can approximately recover its original shape in a case where the resin composition is elongated and is thereafter recovered. When R exceeds 95%, stress for restoration is reduced, and thus a time for the restoration of the original shape is extremely lengthened. Even when the resin composition tries to recover after being elongated, it is difficult for the resin composition to recover its original shape.

Regarding R and α, more preferable ranges of the values thereof are:

$$30\% \leq R \leq 60\%, \text{ and}$$

$$0\% \leq \alpha \leq 1.5\%.$$

The structure which uses the resin composition that exhibits a stress relaxation ratio and a residual strain ratio in the above ranges has properties of both high stress relaxation properties during tension and excellent restoration properties after extension, and thus a structure which is less likely to be broken and has excellent reliability can be obtained.

As an even more preferable exemplary embodiment, in a case where the resin composition is elongated in a range of 15% or higher and 20% or lower in the extension-restoration test, it is preferable that regarding the slopes of changes in tensile force during restoration and during extension with respect to strain amount, the resin composition satisfies slope during restoration/slope during extension≤0.95. More preferably, the resin composition satisfies slope during restoration/slope during extension≤0.90.

That is, it is preferable that the slope (arrow) of the curve (approximately straight line) indicating the extension process of the resin composition of this exemplary embodiment shown in FIG. 1, that is, the elastic modulus during extension is greater than the slope (arrow) of the curve (approximately straight line) indicating the restoration process, that is, the elastic modulus during restoration.

Accordingly, a resin composition having more excellent stress relaxation properties can be obtained.

As an even more preferable exemplary embodiment, in the resin composition, the stress value measured during maximum extension (during 25% extension) in the extension-restoration test becomes the maximum stress value. Accordingly, the yield phenomenon does not occur in the material and it is possible to exhibit higher restoration properties.

In addition, it is preferable that the resin composition of this exemplary embodiment is a resin composition which satisfies each of the above relationships even when the extension process and the restoration process are repeated two or more times in the extension-restoration test. Accordingly, the resin composition which has more excellent restoration properties and does not lose recovering force even when being subjected to a plurality of extension operations can be obtained. The resin composition exhibits more excellent bending resistance and the like when being used, for example, in a flexible display.

Furthermore, it is preferable that the resin composition of this exemplary embodiment is a resin composition in which, in a case where measurement is started simultaneously with the end of the extension process in the following stress relaxation property test, the tensile force $F_{B0}$ immediately after the end of the extension process and a tensile force $F_B(t30)$ when 30 minutes has elapsed after the end of the extension process satisfy the following expression:

$$0.1 \leq (F_B(t30)/F_{B0}) \leq 0.7.$$

The resin composition having these properties becomes a resin composition having more excellent stress relaxation properties and is thus very useful.

[2] EXAMPLES OF RESIN COMPOSITION (2-1) Examples of Resin Composition Containing Polyrotaxane The composition of the resin composition of this exemplary embodiment is not particularly limited as long as the resin composition satisfies the above properties. Preferably, the resin composition of this exemplary embodiment includes at least a thermosetting resin and a curing agent. Furthermore, as the thermosetting resin, an epoxy resin is preferably exemplified.

As one of more specific exemplary embodiments, for example, a resin composition containing polyrotaxane (A), a thermosetting resin (B), and a curing agent (C) may be employed. Hereinafter, each component will be described in more detail.

(2-1a) Polyrotaxane

Polyrotaxane which is the component (A) is a molecule having a structure in which a straight-chain axle molecule is threaded through a cyclic molecule and the terminals of the axle molecule are blocked so as not to allow the dissociation of the cyclic molecule. Specifically, for example, polyrotaxane described in Japanese Patent No. 4482633 may be employed.

As the polyrotaxane (A) that can be used in this exemplary embodiment, there is a compound in which a molecule having terminal functional groups, which acts as the axle molecule is included in the cyclic molecule in a skewer shape and the terminal functional groups are chemically modified by blocking groups which are sufficiently bulky to prevent the dissociation of the cyclic molecule. As long as the structure is provided, the structure and type of the molecules included therein, the inclusion ratio of the cyclic molecule, a manufacturing method, and the like are not limited.

For example, the axle molecule that can be contained in the polyrotaxane is not particularly limited as long as the axle molecule has a molecular weight of 10,000 or higher and has terminals that are chemically modified by blocking groups. Examples thereof include poly(vinyl alcohol), polyvinylpyrrolidone, poly(meth)acrylic acid cellulose-based resins, polyacrylamide, poly(ethylene oxide), poly(ethylene glycol), poly(propylene glycol), poly(vinyl acetal)-based resins, poly(vinyl methyl ether), polyamines, polyethyleneimines, casein, gelatin, starch, polyolefins, polyesters, poly(vinyl chloride), polystyrene, copolymers such as acrylonitrile-styrene copolymers, acrylic resins, polycarbonates, polyurethanes, poly(vinyl butyral), polyisobutylene, polytetrahydrofuran, polyamides, polyimides, polydienes, polysiloxanes, polyurea, polysulfides, polyphosphazene, polyketones, polyphenylene, polyhaloolefins, and derivatives thereof. Among these, poly(ethylene glycol) can be appropriately used.

In addition, the cyclic molecule that can be contained in the polyrotaxane is a wheel-shaped molecule through which a polymer molecule can be threaded, and is not particularly limited as long as the cyclic molecule has at least one reactive group so as to react with a cross-linking agent. Specific examples thereof include cyclodextrins, crown ethers, cryptands, macrocyclic amines, calixarenes, and cyclophanes. Among these, cyclodextrins and substituted cyclodextrins are preferable, and substituted cyclodextrins obtained by further introducing a reactive group (functional group) into the substituted structure are more preferable.

Examples of the functional group introduced into the cyclic molecule of the polyrotaxane preferably include hydroxyl groups, carboxyl groups, acrylic groups, methacrylic groups, epoxy groups, and vinyl groups.

By the functional group introduced into the cyclic molecule as described above, cyclic molecules can be cross-linked to each other or the polyrotaxane and the resin can be cross-linked to each other through a cross-linking agent. In addition, the resin connected to the polyrotaxane as described above can achieve flexibility.

The structure that blocks the terminals of the polyrotaxane in this exemplary embodiment (terminal blocking groups) is not particularly limited as long as the structure is sufficiently bulky to prevent the dissociation of the cyclic molecule. Specifically, for example, cyclodextrin groups, adamantane groups, dinitrophenyl groups, trityl groups, and the like may be used, and adamantane groups and the like may be preferably used.

Molecules that can be used as the cyclic molecule are not particularly limited as long as a chain polymer molecule can be included in the ring of the cyclic molecule. As a cyclic molecule that is appropriately used, cyclodextrin may be employed. In addition, it is preferable that the cyclic molecule has a functional group. Furthermore, it is preferable that the functional group is a —OH group, an acrylic group, or a methacrylic group.

The polyrotaxane that can be used in this exemplary embodiment may be synthesized according to a well-known method (for example, the methods described in Pamphlet of International Publication No. WO01/83566, Japanese Patent Unexamined Publication No. 2005-154675, and Japanese Patent No. 4482633), and a commercially available product may also be used. Specifically, SeRM Super Polymer A1000 manufactured by Advanced Softmaterials Inc. or the like may be used.

(2-1b) Thermosetting Resin

Next, as the thermosetting resin (B), thermosetting resins such as epoxy resins, phenol resins, polyimide resins, urea resins, melamine resins, unsaturated polyesters, and urethane resins may be employed without particular limitations, and among these, epoxy resins are preferably used.

Specific examples of the epoxy resin include bisphenol A type epoxy resins, bisphenol F type epoxy resins, bisphenol S type epoxy resins, aralkyl epoxy resins, phenol novolac type epoxy resins, alkylphenol novolac type epoxy resins, biphenol type epoxy resins, naphthalene type epoxy resins, dicyclopentadiene type epoxy resins, the product of epoxidation of a condensate of a phenol and an aromatic aldehyde having a phenolic hydroxyl group, triglycidyl isocyanurates, and alicyclic epoxy resins. Depending on the circumstances, these epoxy resins may be used singly or in a combination of two or more types thereof.

As a more preferable example of the epoxy resin, an epoxy resin which contains 2 or more epoxy groups and 3 methyl groups in a single molecule and has a molecular weight of 500 or higher is appropriately exemplified. As this type of epoxy resin, a commercially available epoxy resin may be used. For example, JER1003 (manufactured by Mitsubishi Chemical Corporation, 7 to 8 methyl groups, difunctional, a molecular weight of 1300), EXA-4816 (manufactured by DIC Corporation, a molecular weight of 824, many methyl groups, difunctional), YP50 (manufactured by Nippon Steel & Sumikin Chemical Co., Ltd., a molecular weight of 60,000 to 80,000, many methyl groups, difunctional), and the like may be employed.

In addition, epoxy resins such as those mentioned above may be used singly or in a combination of two or more types thereof.

(2-1c) Curing Agent

The curing agent (C) is not particularly limited as long as the curing agent can act as a curing agent for the thermosetting resin which is the component (B). In particular, examples of the curing agent that can be preferably used for the epoxy resins include phenol resins, amine-based compounds, acid anhydrides, imidazole-based compounds, sulfide resins, and dicyandiamide. In addition, a photo/ultraviolet curing agent, a thermal cationic curing agent, or the like may also be used. Depending on the circumstances, these curing agents may be used singly or in a combination of two or more types thereof.

In addition, a cross-linking agent may further be added to the resin composition containing polyrotaxane of this exemplary embodiment. The cross-linking agent may be used without particular limitations as long as the cross-linking agent can form a structure that is cross-linked to at least a portion of the cyclic molecule in the polyrotaxane (at least one reactive group contained in the cyclic molecule of the polyrotaxane).

Specific examples thereof include isocyanate, cyanuric chloride, trimesoyl chloride, terephthaloyl chloride, epichlorohydrin, dibromobenzene, glutaraldehyde, phenylene diisocyanate, tolylene diisocyanate, divinyl sulfone, 1,1-carbonyldiimidazole, and alkoxysilane.

In this exemplary embodiment, the number of functional groups contained in the cross-linking agent is not limited, but it is preferable that a molecule of the cross-linking agent has two or more functional groups in order to cross-link the cyclic molecules of the polyrotaxane to each other or to cross-link the cyclic molecule to a resin described later. In a case where the cross-linking agent contains a plurality of functional groups, these functional groups may be the same or may be different from each other.

Furthermore, a cross-linking agent that is compatible with the polyrotaxane is more preferable, and in a case where a polyrotaxane containing a cyclic molecule having a hydroxyl group is used as the polyrotaxane of the component (A), isocyanates, derivatives thereof, and the like may be appropriately used as the cross-linking agent. This isocyanate resin is not particularly limited. In addition, a blocked isocyanate resin having a blocked isocyanate group may also be used.

On the other hand, in a case where a polyrotaxane containing a cyclic molecule having an acrylic group or a methacrylic group is used as the polyrotaxane of the component (A), an acrylic resin may be added as a reactive resin. This acrylic resin is not particularly limited.

(2-1d) Proportions of Components in Resin Composition, Additives, Adjustment Methods, and the Like The proportions of the components in the resin composition are not particularly limited as long as the effect of the present invention can be exhibited. However, when the sum of the components (A) to (C) accounts for 100 parts by mass, the polyrotaxane (A) is in a proportion of 10 parts by mass to 80 parts by mass, and more preferably 30 parts by mass to 50 parts by mass, the thermosetting resin (B) is in a proportion of 10 parts by mass to 89.9 parts by mass, and more preferably 30 parts by mass to 50 parts by mass, and the curing agent (C) is in a proportion of 0.1 parts by mass to 30 parts by mass, and more preferably 0.1 parts by mass to 20 parts by mass. Moreover, in a case where the resin composition of this exemplary embodiment contains an isocyanate resin as the cross-linking agent, the isocyanate resin may be added to the polyrotaxane component (A) in a proportion of 0 parts by mass to 50 parts by mass, and preferably 10 parts by mass to 40 parts by mass.

Furthermore, the resin composition according to this exemplary embodiment may contain, if necessary, other additives, such as a curing catalyst (a curing accelerator), a flame retardant, a flame retardant aid, a leveling agent, and a colorant, in a range in which the effect of the present invention is not impaired.

A method of preparing the polyrotaxane-containing resin composition of this exemplary embodiment is not particularly limited, and for example, the resin composition of this exemplary embodiment can be obtained by homogeneously mixing the polyrotaxane, the curing agent, the cross-linking agent, the thermosetting resin, and a solvent. The solvent used here is not particularly limited, and for example, toluene, xylene, methyl ethyl ketone, acetone, or the like may be used. These solvents may be used singly or in a combination of two or more types thereof. In addition, if necessary, an organic solvent or a variety of additives for adjusting viscosity may be blended with the resin composition.

By heating and drying the resin composition obtained as described above, the resin composition is cured while vaporizing the solvent, thereby obtaining a film.

As a method and an apparatus for heating and drying the resin composition and conditions used therefor, various types of means used in the related art or improved means may be employed. A specific heating temperature and a heating time may be appropriately set according to the cross-linking agent, the solvent, and the like used herein. For example, by heating and drying the resin composition at 50° C. to 200° C. for about 60 minutes to 120 minutes, the resin composition can be cured.

(2-2) Examples of Resin Composition Containing Modified Group Modified by Alkylene Oxide Next, another example of a specific exemplary embodiment of the resin composition of this exemplary embodiment is, for example, a resin composition which contains an epoxy resin (D), which has a modified group that is modified by an alkylene oxide having 2 to 3 carbon atoms, contains 4 or more moles of the modified group with respect to 1 mole of epoxy groups in the molecule, has 2 or more moles of epoxy groups, and has an epoxy equivalent of 450 eq/mol or higher, and a curing agent (E).

(2-2a) Epoxy Resin Containing Modified Group Modified by Alkylene Oxide

As the epoxy resin (D), specifically, a propylene oxide adduct type bisphenol A type epoxy resin (EP4003S manufactured by Adeka Corporation), and an ethylene oxide adduct type hydroxyphenylfluorene type epoxy resin (EG-280 manufactured by Osaka Gas Chemicals Co., Ltd.) may be employed.

In addition, the epoxy resin-containing resin composition of this exemplary embodiment may further contain an epoxy resin other than the epoxy resin (D) described above, such as a bisphenol A type epoxy resin, a bisphenol F type epoxy resin, a bisphenol S type epoxy resin, an aralkyl epoxy resin, an aliphatic epoxy resin, or an alicyclic epoxy resin, in a range in which the effect of the present invention is not impaired.

In this case, the proportion of the epoxy resin (D) blended with the overall epoxy resin components is about 60 mass % to 99 mass %, and preferably about 80 mass % to 95 mass %.

(2-2b) Curing Agent

As the curing agent (E), a curing agent which is generally well-known as a curing accelerator for epoxy resins may be used. Specifically, a curing agent selected from among phenolic resins, acid anhydrides and sulfonium salts is preferable in terms of curing properties, and if necessary, a combination of two or more types of a curing accelerator such as an imidazole-based compound and these curing agents may also be used.

As the phenol curing agent, generally, a monomer, oligomer, or polymer having 2 or more phenolic hydroxyl groups in a molecule may be used, and the molecular weight and molecular structure thereof are not particularly limited. For example, a resin obtained by allowing phenols such as phenol, cresol, resorcin, catechol, bisphenol A, bisphenol F, phenylphenol, or aminophenol, and/or naphthos such as α-naphthol, β-naphthol, or dihydroxynaphthalene, and a compound having an aldehyde group such as formaldehyde, to undergo condensation or co-condensation in the presence of an acidic catalyst, examples of the resin being phenol novolac resins and cresol novolac resins, or a phenol aralkyl resin synthesized from phenols and/or naphthols and dimethoxy paraxylene or bis(methoxymethyl)biphenyl may be employed. These curing agents may be used singly or in a combination of two or more types thereof.

Examples of the acid anhydride-based curing agent include maleic anhydride, succinic anhydride, itaconic anhydride, citraconic anhydride, phthalic anhydride, 1,2,3,6-tetrahydrophthalic anhydride, 3,4,5,6-tetrahydrophthalic anhydride, hexahydrophthalic anhydride, 4-methylhexahydrophthalic anhydride, 3-methyl-1,2,3,6-tetrahydrophthalic anhydride, 4-methyl-1,2,3,6-tetrahydrophthalic anhydride, and methyl-3,6-endomethylene-1,2,3,6-tetrahydrophthalic anhydride.

Examples of the sulfonium salt-based curing agent include alkyl sulfonium salts, benzyl sulfonium salts, dibenzyl sulfonium salts, and substituted benzyl sulfonium salts. Specific examples thereof include alkyl sulfonium salts such as 4-acetophenyl dimethyl sulfonium hexafluoroantimonate, 4-acetoxyphenyl dimethyl sulfonium hexafluoroarsenate, dimethyl-4-(benzyloxycarbonyloxy)phenyl sulfonium hexafluoroantimonate, dimethyl-4-(benzoyloxy)phenyl sulfonium hexafluoroantimonate, dimethyl-4-(benzoyloxy)phenyl sulfonium hexafluoroarsenate, and dimethyl-3-chloro-4-acetoxyphenyl sulfonium hexafluoroantimonate; benzyl sulfonium salts such as benzyl-4-hydroxyphenylmethyl sulfonium hexafluoroantimonate, benzyl-4-hydroxyphenylmethyl sulfonium hexafluorophosphate, 4-acetoxyphenylbenzylmethyl sulfonium hexafluoroantimonate, benzyl-4-methoxyphenylmethyl sulfonium hexafluoroantimonate, benzyl-2-methyl-4-hydroxyphenylmethyl sulfonium hexafluoroantimonate, benzyl-3-chloro-4-hydroxyphenylmethyl sulfonium hexafluoroarsenate, and 4-methoxybenzyl-4-hydroxyphenylmethyl sulfonium hexafluorophosphate; dibenzyl sulfonium salts such as dibenzyl-4-hydroxyphenyl sulfonium hexafluoroantimonate, dibenzyl-4-hydroxyphenyl sulfonium hexafluorophosphate, 4-acetoxyphenyl dibenzyl sulfonium hexafluoroantimonate, dibenzyl-4-methoxyphenyl sulfonium hexafluoroantimonate, dibenzyl-3-chloro-4-hydroxyphenyl sulfonium hexafluoroarsenate, dibenzyl-3-methyl-4-hydroxy-5-tert-butylphenyl sulfonium hexafluoroantimonate, and benzyl-4-methoxybenzyl-4-hydroxyphenyl sulfonium hexafluorophosphate; and substituted benzyl sulfonium salts such as p-chlorobenzyl-4-hydroxyphenylmethyl sulfonium hexafluoroantimonate, p-nitrobenzyl-4-hydroxyphenylmethyl sulfonium hexafluoroantimonate, p-chlorobenzyl-4-hydroxyphenylmethyl sulfonium hexafluorophosphate, p-nitrobenzyl-3-methyl-4-hydroxyphenylmethyl sulfonium hexafluoroantimonate, 3,5-dichlorobenzyl-4-hydroxyphenylmethyl sulfonium hexafluoroantimonate, and o-chlorobenzyl-3-chloro-4-hydroxyphenylmethyl sulfonium hexafluoroantimonate.

(2-2c) Proportions of Components in Resin Composition, Additives, Adjustment Methods, and the Like The proportions of the components in the resin composition are not particularly limited as long as the effect of the present invention can be exhibited. However, when the total amount of the resin composition accounts for 100 parts by mass, the epoxy resin (D) is in a proportion of 50 parts by mass to 99 parts by mass, and more preferably 60 parts by mass to 80 parts by mass, and the curing agent (E) is in a proportion of 1 parts by mass to 50 parts by mass, and more preferably 1 parts by mass to 40 parts by mass.

Furthermore, the resin composition according to this exemplary embodiment may contain, if necessary, other additives, such as a curing catalyst (a curing accelerator), a flame retardant, a flame retardant aid, a leveling agent, and a colorant, in a range in which the effect of the present invention is not impaired.

A method of preparing the epoxy resin-containing resin composition of this exemplary embodiment is not particularly limited, and for example, the epoxy resin, the curing agent, and a solvent are homogeneously mixed with each other. The solvent used here is not particularly limited, and for example, toluene, xylene, methyl ethyl ketone, acetone, or the like may be used. These solvents may be used singly or in a combination of two or more types thereof. Furthermore, if necessary, an organic solvent or a variety of additives for adjusting viscosity may be blended with the resin composition.

As a method and an apparatus for heating and drying the resin composition and conditions used therefor, various types of means used in the related art or improved means may be employed. A specific heating temperature and a heating time may be appropriately set according to the cross-linking agent, the solvent, and the like used herein. For example, by heating and drying the resin composition at 130° C. to 200° C. for about 60 minutes to 180 minutes, the resin composition can be cured.

[3] SPECIFIC EXAMPLE OF STRUCTURE OF THIS EXEMPLARY EMBODIMENT

Hereinafter, the structural member for electronic devices according to the present invention will be described in detail with reference to Examples described below, but the scope of the present invention is not limited to Examples.

EXAMPLES

First, materials used in Examples are as follows.
(Polyrotaxane)
  Polyrotaxane: ("A1000" manufactured by Advanced Soft-materials Inc., which contains PEG as an axle molecule, α-cyclodextrin as a cyclic molecule, and an OH group as a reactive group)
(Thermosetting Resin)
  Epoxy resin ("JER1003" manufactured by Mitsubishi Chemical Corporation, 7 to 8 methyl groups, difunctional, a molecular weight of 1300)
  Epoxy resin ("EXA-4816" manufactured by DIC Corporation, a molecular weight of 824, many methyl groups, difunctional)
  Epoxy resin ("YP50" manufactured by Nippon Steel & Sumikin Chemical Co., Ltd., a molecular weight of 60,000 to 80,000, many methyl groups, difunctional)

Propylene oxide adduct type bisphenol A type epoxy resin ("EP4003S" manufactured by Adeka Corporation)

Ethylene oxide adduct type hydroxyphenylfluorene type epoxy resin ("EG-280" manufactured by Osaka Gas Chemicals Co., Ltd.) (Curing Agent)

Cationic curing agent ("SI-150" manufactured by Sanshin Chemical Industry Co., Ltd., sulfonium hexafluoroantimonate)

Polyfunctional phenol-based curing agent ("GPH-103" manufactured by Nippon Kayaku Co., Ltd., biphenyl aralkyl type phenol)

Epoxy resin curing agent ("YH-306" manufactured by Mitsubishi Chemical Corporation, acid anhydride-based curing agent)

Imidazole-based curing accelerator ("2E4MZ" manufactured by Shikoku Chemicals Corporation, 2-ethyl-4-methylimidazole) (Other Additive Components)

Cross-linking agent: (isocyanate, "DN950" manufactured by DIC Corporation)

[Adjustment of Resin Compositions 1 to 5 and 9 and Production of Evaluation Samples]

Resin compositions 1 to 5 and 9 were prepared by adding a solvent (methyl ethyl ketone) to blended compositions (parts by mass) shown in Table 1 below so that a solid content concentration of 40 mass % was achieved, and homogeneously mixing the components (at 300 rpm for 30 minutes).

Next, the obtained resin composition was applied onto a PET film (support) having a thickness of 75 μm using a bar coater, and the resultant was dried at 100° C. for 10 minutes to remove the solvent and was heated and cured at 170° C. for 60 minutes.

The obtained cured material was formed into a film having a dumbbell specimen No. 6 shape (a measurement portion width of 4 mm, a parallel portion length of 25 mm) with a thickness of 50 μm and was used as a sample in the following evaluations.

[Extension-Restoration Test]

In the extension-restoration test used in this exemplary embodiment, samples of Examples described above and Comparative Examples were used. An extension process was performed and thereafter a restoration process was performed under the following conditions, and a stress relaxation ratio R and a residual strain ratio α were calculated according to the following calculation method.

(Extension Process Conditions)

In order to remove deflection that had occurred when the test piece was attached to a gripper, deflection correction was performed with a force of 0.05 N or lower.

Testing rate: 25 mm/min from 0% to 25% extension

Temperature condition: 23° C.

Extension and holding conditions: a holding time of 5 minutes at 25% extension (Restoration Process Conditions)

Testing rate: 0.1 mm/min until a tensile force became 0±0.05 N.

Temperature condition: 23° C.

Stress relaxation ratio calculation method: the tensile force at the time of the end of the extension process was measured and is referred to as an initial tensile force $F_{A0}$. Thereafter, the strain amount was held under the above-described extension and holding conditions and the tensile force was measured after 5 minutes. This is referred to as $F_A(t5)$. The stress relaxation ratio R was calculated by the following expression.

$$R = \frac{F_{AO} - F_A(t5)}{F_{AO}} \times 100 \quad [\text{Expression 2}]$$

Residual strain ratio calculation method: the strain amount was measured at the point in time when the tensile force became 0±0.05 N in the restoration process, and is referred to as the residual strain ratio α.

The stress relaxation ratio R and the residual strain ratio α obtained as described above are shown in Table 1.

Furthermore, in a case where the resin composition was elongated in a range of 15% to 20% in the extension-restoration test, the slopes of the changes in tensile force during restoration and during extension with respect to strain amount (slope during restoration/slope during extension) was obtained. The results are also shown in Table 1.

[Stress Relaxation Property Test]

Using the samples of Examples and Comparative Examples, an extension process was performed by a tensile and compression testing machine based on ISO 3384 under the following conditions, and the tensile force at the time of the end of the extension was measured and was referred to as an initial tensile force $F_{B0}$. Thereafter, a tensile force $F_B(t30)$ after 30 minutes is measured.

(Extension Process Conditions)

In order to remove deflection that had occurred when the test piece was attached to a gripper, deflection correction was performed. The deflection correction was performed with a force of 0.05 N or lower.

Testing rate: 25 mm/min until 50% extension

Temperature condition: 23° C.

Extension and holding conditions: a holding time of 30 minutes at 50% extension

In addition, the value of $F_B(t30)/F_{B0}$ was calculated. The results are shown in Table 1.

TABLE 1

| | | Resin composition 1 | Resin composition 2 | Resin composition 3 | Resin composition 4 | Resin composition 5 | Resin composition 9 |
|---|---|---|---|---|---|---|---|
| Polyrotaxane | A1000 | 100 | 100 | 100 | 100 | 100 | 100 |
| Thermosetting resin | JER1003 | 75 | | | | 150 | 100 |
| | EXA-4816 | | 100 | | | | |
| | YP50 | | | 100 | | | |
| Curing agent | 2E4MZ | 1.1 | | 1.5 | | 2.25 | 1.5 |
| | SI-150 | | 2 | | | | |
| Additive component | DN-950 | 45 | 45 | 45 | 45 | 45 | 45 |
| Stress relaxation ratio R [20% to 95%] | | 25.3% | 43.0% | 39.5% | 2.0% | 82.0% | 31.0% |

TABLE 1-continued

|  | Resin composition 1 | Resin composition 2 | Resin composition 3 | Resin composition 4 | Resin composition 5 | Resin composition 9 |
| --- | --- | --- | --- | --- | --- | --- |
| Residual strain ratio α [0% to 3%] | 0.6% | 2.7% | 1.1% | 0.5% | 7.3% | 0.8% |
| Slope during restoration/slope during extension [0 to 0.95] | 0.91 | 0.92 | 0.83 | 1.04 | 0.98 | 0.86 |
| F(t30)/F0 [0.1 to 0.7] | 0.62 | 0.6 | 0.67 | 0.97 | 0.24 | 0.38 |

[Adjustment of Resin Compositions 6 to 8 and Production of Evaluation Samples]

Regarding a resin composition 8, a resin composition was prepared by adding a solvent (methyl ethyl ketone) to blended compositions (parts by mass) shown in Table 1 above so that a solid content concentration of 40 mass % was achieved, and homogeneously mixing the components (at 300 rpm for 30 minutes).

Next, the obtained resin composition was applied onto a PET film (support) having a thickness of 75 μm using a bar coater, and the resultant was dried at 100° C. for 10 minutes to remove the solvent and was heated and cured at 170° C. for 60 minutes.

Regarding resin compositions 6 and 7, resin compositions were prepared by homogeneously mixing the corresponding components (at 300 rpm for 30 minutes) at a solid content concentration of 100%.

Next, the obtained resin composition was applied onto a PET film (support) having a thickness of 75 μm using a bar coater, and the resultant was heated and cured in a closed state at 170° C. for 120 minutes.

The obtained cured material was formed to have a dumbbell specimen No. 6 shape (a measurement portion width of 4 mm, a parallel portion length of 25 mm) with a thickness of 50 μm, and by using the cured material as a sample in the following evaluations, the extension-restoration test and the stress relaxation property test described above were performed in the same manner as in Example 1.

The results are shown in Table 2.

[Production of Structure]

Figure 3:
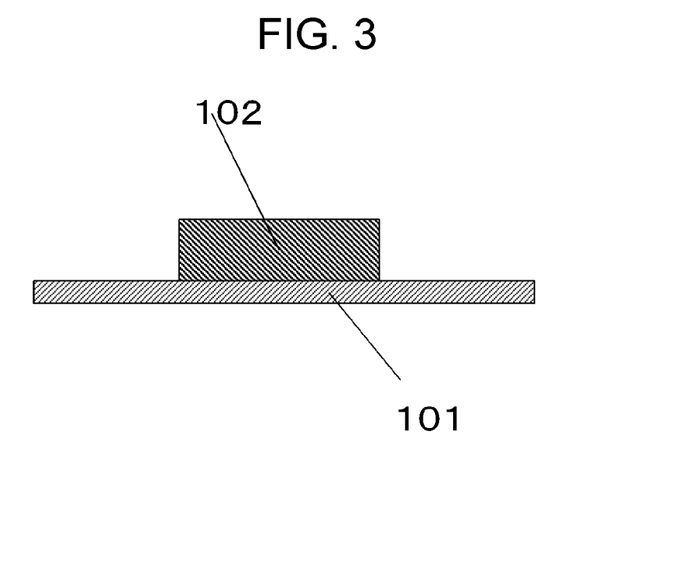
FIG. 3 is a sectional view of a structure according to Example 1 of the present invention.

[Example 1] Structural Member for Electronic Devices in which Silicon Chip is Mounted A structural member for electronic devices described in Example 1 is, as illustrated in FIG. 3, a structure in which a silicon chip that is electronic element 102 is mounted on sheet 101. Sheet 101 is made of a resin composition described in (Example 1-1) or (Example 1-2).

Example 1-1

Sheet 101 in a semi-cured state was produced by applying resin composition 1 prepared as described above to a PET film and heating the resultant at 100° C. for 10 minutes. A silicon chip was attached thereto on a hot plate at 100° C., and the resultant was further heated and cured at 170° C. for 1 hour, thereby obtaining a sheet-like structure in which the silicon chip was mounted on sheet 101.

Example 1-2

Resin composition 2 prepared as described above was prepared in the same manner as in (Example 1-1), thereby obtaining a sheet-like structure in which the silicon chip was mounted on sheet 101.

TABLE 2

|  |  | Resin composition 6 | Resin composition 7 | Resin composition 8 |
| --- | --- | --- | --- | --- |
| Thermosetting resin | Propylene oxide adduct type bisphenol A type epoxy resin | 100 | — | — |
|  | Ethylene oxide adduct type hydroxyphenylfluorene type epoxy resin | — | 100 | — |
|  | jER1003 | — | — | 100 |
|  | GPH-103 | 49 | — | 42 |
|  | YH-306 | — | 51 | — |
|  | 2E4MZ | 0.15 | 0.15 | 0.14 |
| Stress relaxation ratio R [20% to 95%] |  | 53.2% | 41.1% | *1 |
| Residual strain ratio α [0% to 3%] |  | 2.7% | 2.1% | *1 |
| Slope during restoration/slope during extension [0 to 0.95] |  | 0.83 | 0.81 | *1 |
| F(t30)/F0 [0.1 to 0.7] |  | 0.41 | 0.5 | *1 |

*1 Unmeasurable due to breaking during test

Comparative Example 1

Resin composition 4 prepared as described above was prepared in the same manner as in (Example 1-1), thereby obtaining a sheet-like structure in which a silicon chip was mounted on a sheet.

Figure 4:
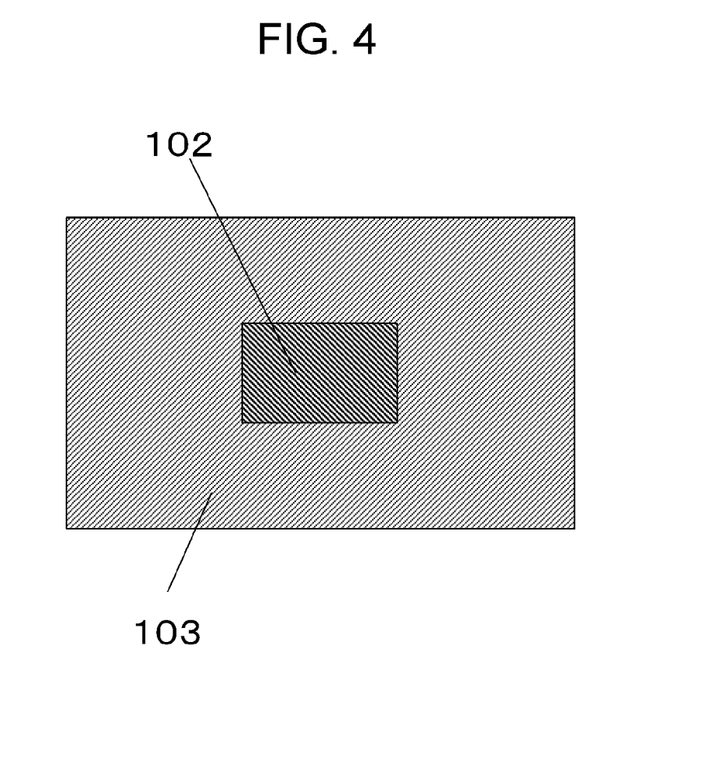
FIG. 4 is a sectional view of a structure according to Example 2 of the present invention.

[Example 2] Structural Member for Electronic Devices in which Silicon Chip is Buried A structural member for electronic devices described in Example 2 is, as illustrated in FIG. 4, a structure in which a silicon chip that is electronic element 102 is buried in or sealed by resin layer 103. Resin layer 103 is made of a resin structure described in (Example 2-1) or (Example 2-2).

Example 2-1

Resin layer 103 in a semi-cured state was produced by disposing a silicon chip on a PET film subjected to a peeling treatment, applying resin composition 2 prepared as described above to the PET film, and heating the resultant at 100° C. for 10 minutes. A resin surface of the resin layer on the semi-cured side was installed on the silicon chip side and was heated and pressurized at 150° C. so as to cause the silicon chip to be buried in resin layer 103, and the resultant was then taken out and was post-heated by a drier to cure the resin, thereby obtaining a sheet-like structure in which the silicon chip was buried in resin layer 103.

Example 2-2

Resin composition 3 was used instead of resin composition 2 and was prepared in the same manner as in (Example 2-1), the silicon chip was buried in resin layer 103, and the resultant was then taken out and was post-heated by a drier to cure the resin, thereby obtaining a sheet-like structure in which the silicon chip was buried in resin layer 103.

Comparative Example 2

Resin composition 5 was used instead of resin composition 2 and was prepared in the same manner as in (Example 2-1), a silicon chip was buried in a resin layer, and the resultant was then taken out and was post-heated by a drier to cure the resin, thereby obtaining a sheet-like structure in which the silicon chip was buried in the resin layer.

[Evaluations and Results]

Regarding each of the sheet-like structures produced in Examples 1 and 2 and Comparative Examples 1 and 2, both ends of the structure were gripped and elongated by 10% and 30%, and the state of the structure when the extension stress was released for restoration was checked. The results are shown in Table 3. Evaluation was performed according to the following criteria.

O: original state was recovered without a portion or the entirety of the structure being broken during extension.

X: original state was not recovered although a portion or the entirety of the structure was not broken during extension.

Broken NG: a portion of the entirety of the structure was broken during extension.

TABLE 3

|  | 10% extension-restoration | 30% extension-restoration | Turned state of LED |
|---|---|---|---|
| Example 1-1 | O | O |  |
| Example 1-2 | O | O |  |
| Example 2-1 | O | O |  |
| Example 2-2 | O | O |  |
| Example 2-1 | O | O |  |
| Example 2-2 | O | O |  |
| Comparative Example 1 | Broken NG | Broken NG |  |
| Comparative Example 2 | X | X |  |
| Example 3-1 | O | O |  |
| Example 3-2 | O | O |  |
| Comparative Example 3 | O | O |  |
| Example 3-4 | O | O |  |
| Comparative Example 1-1 | Broken NG | Broken NG |  |
| Comparative Example 1-2 | Broken NG | Broken NG |  |
| Comparative Example 1-3 | Broken NG | Broken NG |  |
| Comparative Example 2-1 | X | X |  |
| Comparative Example 2-2 | X | X |  |
| Comparative Example 2-3 | X | X |  |

Figure 5:
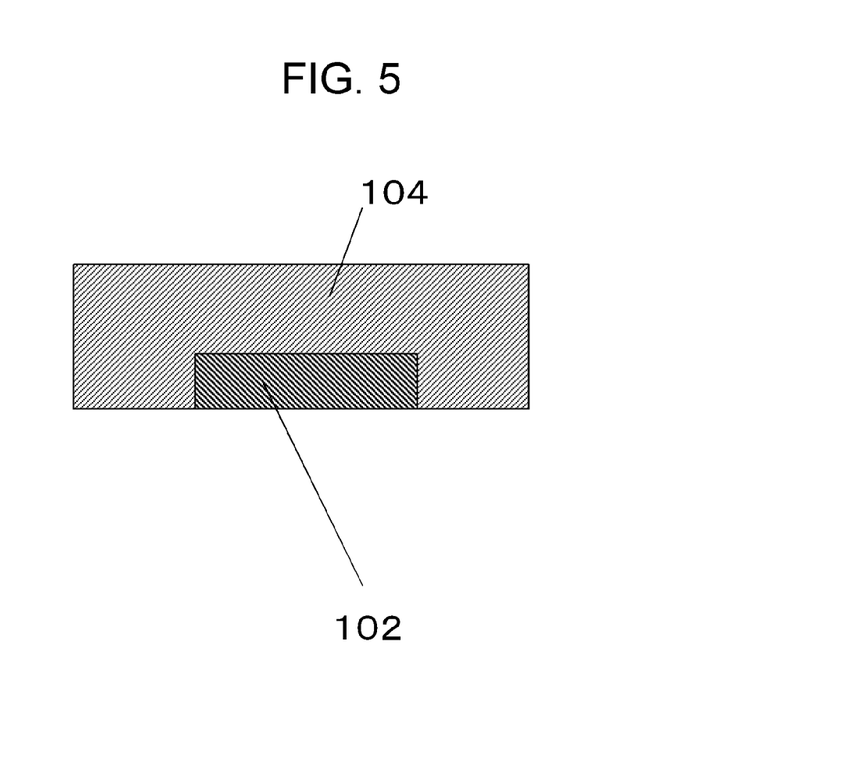
FIG. 5 is a sectional view of a structure according to Example 3 of the present invention.

[Example 3] Structural Member for Electronic Devices Having Conductive Portion A structural member for electronic devices described in Example 3 is, as illustrated in FIG. 5, a structure in which one side of an LED which is electronic element 102 is sealed by protection layer 104. This protection layer is made of a resin composition described in (Example 3-1) or (Example 3-2).

Example 3-1

An LED was installed on a PET film, protection layer 104 made of resin composition 3 prepared as described above was applied thereto using a bar coater, a solvent was dried at 80° C., and the resultant was then cured at 120° C., thereby obtaining a sheet-like structure including the LED of which one side is sealed. The structure was peeled off from the PET film, and a wire to become a lead for connection to a power source from an electrode of the LED was formed by gold deposition.

Example 3-2

An LED was installed on a PET film, protection layer 104 made of resin composition 6 prepared as described above was applied thereto using a bar coater, a solvent was dried at 80° C., and the resultant was then cured at 150° C., thereby obtaining a sheet-like structure including the LED of which one side is sealed. The structure was peeled off from the PET film, and a wire to become a lead for connection to a power source from an electrode of the LED was formed by gold deposition.

Comparative Example 3

An LED was installed on a PET film, protection layer 104 made of resin composition 8 prepared as described above was applied thereto using a bar coater, a solvent was dried at 80° C., and the resultant was then cured at 150° C., thereby obtaining a sheet-like structure including the LED of which one side is sealed. The structure was peeled off from the PET film, and a wire to become a lead for connection to a power source from an electrode of the LED was formed by gold deposition.

[Evaluation: Stretchability Checking]

Regarding each of the sheet-like structures produced in Example 3 and Comparative Example 3, both ends of the structure were gripped and elongated by 10% and 30% in a state where the lead portion of the rear surface thereof and the power source were connected and thus the LED was turned on, and a change in the state of the LED being turned on and the state of the structure when the extension stress was released for restoration was checked. The results are shown in Table 4. Evaluation was performed according to the following criteria.

O: original state was recovered without a portion or the entirety of the structure being broken during extension.

X: original state was not recovered although a portion or the entirety of the structure was not broken during extension.

Broken NG: a portion of the entirety of the structure was broken during extension.

TABLE 4

|  | 10% extension-restoration | 30% extension-restoration | Turned state of LED |
| --- | --- | --- | --- |
| Example 3-1 | O | O | Turned on |
| Example 3-2 | O | O | Turned on |
| Comparative Example 3 | Broken NG | Broken NG | Turned off due to breaking |

Figure 6:
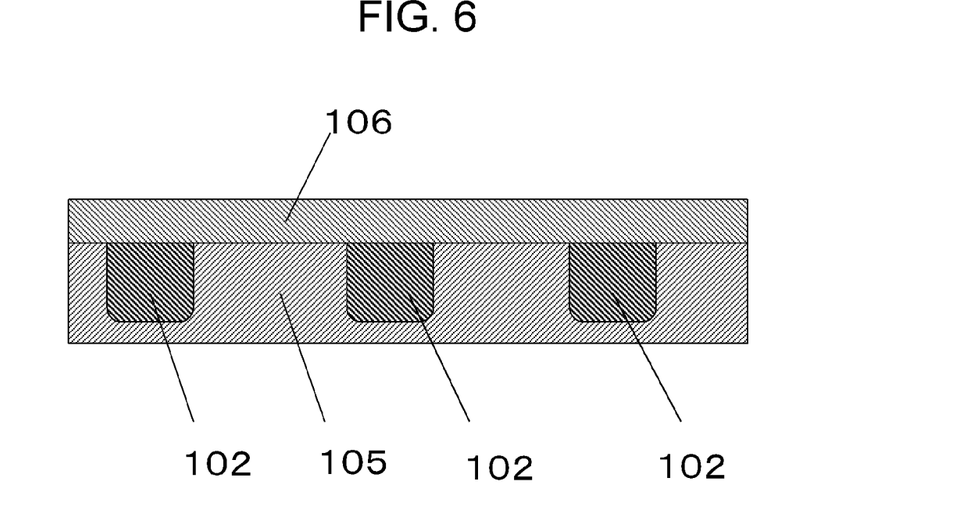
FIG. 6 is a sectional view of a structure according to Example 4 of the present invention.

[Example 4] Structural Member for Electronic Devices for Flexible Display Using Electrophoresis Solution A structural member for electronic devices described in Example 4 is, as illustrated in FIG. 6, a structure in which display element member structures which are electronic elements 102 are formed on embossed film 105. Film 105 is made of resin composition 1 described below.

Embossed film 105 was obtained by applying resin composition 1 prepared as described above to an embossed metal plate using a bar coater and curing the resultant. In addition, film 106 in a semi-cured state was obtained by applying resin composition 1 to a PET film using a bar coater. By attaching embossed film 105 to film 106 in a semi-cured state, a structure having spaces was obtained.

Next, 0.1 g of carbon nanotubes SWCNT "IsoNanotubes-M" (manufactured by NanoIntegris Technologies, Inc.) was weighed, put into 500 g of a 5 wt % sodium dodecyl sulfate aqueous solution, and dispersed by ultrasound for 24 hours, thereby producing an aqueous solution of dispersed CNTs having a concentration of 0.02 wt %.

Moreover, the aqueous solution of dispersed CNTs was applied to both side surfaces of the structure having spaces produced in Example 4, and the resultant was dried at 120° C. for 30 minutes to remove the solvent such that conductive layers (conductive portions) were formed on both side surfaces of the structure.

Next, an electrophoresis solution was produced by injecting positively charged black particles (Carbon Black manufactured by Mitsubishi Chemical Corporation), negatively charged white particles (titanium oxide manufactured by Tayca Corporation), a dispersant (Solsperse 17000 manufactured by The Lubrizol Corporation), and a charge control agent (SPAN-85, reagent) into a high-boiling-point solvent (Isoper-M manufactured by Maruzen Petrochemical Co., Ltd.), and subjecting the resultant to ultrasonic dispersion. The electrophoresis solution was injected into the hollow portions of the structure provided with the conductive layers, using a syringe.

The injection openings were re-sealed by a UV adhesive, thereby producing a display element member.

Comparative Example 4

An embossed film was obtained by applying the resin composition 5 prepared as described above to an embossed metal plate using a bar coater and curing the resultant. In addition, a film in a semi-cured state was obtained by applying a resin to a PET film using a bar coater. By attaching the embossed film to the film in a semi-cured state, a structure having spaces was obtained.

By using this structure, a display element member was produced in the same manner as in Example 4.

[Evaluation: Display Characteristic Checking]

By applying a voltage to the conductive layers of the display element member produced in Example 4, it was checked that the positive side was displayed in white and the negative side was displayed in black. In addition, the same display was checked even during 10% extension and 30% extension. Furthermore, even after the voltage was applied, restoration from the elongated state was achieved, and the same display was checked. However, the display element member produced in Comparative Example 4 was not recovered from the elongated state, underwent slackness, and did not return to its original shape although a display was achieved.

[Discussion]

From the above-described results, it could be seen that the structure of the present invention is very useful as various members for electronics.

[4] SUMMARY REGARDING STRUCTURAL MEMBER FOR ELECTRONIC DEVICES

The structural member for electronic devices of the present invention described above is a structure which includes, as constituent components, an electronic element and a resin composition that is elastically deformable and has low residual strain and stress relaxation properties. As described above, since the resin composition which allows high stress relaxation properties during tension and excellent restoration properties after extension to be compatible with each other is included as the constituent component, it is possible to provide a structure which is less likely to be broken even during stretching and thus has excellent reliability.

[5] ELECTRONIC ELEMENT USED IN STRUCTURAL MEMBER FOR ELECTRONIC DEVICES OF THIS EXEMPLARY EMBODIMENT

The electronic element used in the structure of this exemplary embodiment comes into close contact with at least the resin composition. That is, the electronic element is mounted or disposed on at least the surface of the resin composition. Otherwise, at least the electronic element is included, buried, or sealed in the resin composition.

The electronic element used in the structural member for electronic devices of this exemplary embodiment is not particularly limited, and examples thereof include transistors, signal transmission elements, light-emitting elements, solar power generation elements, diodes, switching elements, capacitors, coils, liquid crystals, and electrophoresis liquids.

In addition, the electronic element used in the structural member for electronic devices of this exemplary embodiment is preferably sealed with the resin composition for the purpose of oxygen shielding, moisture shielding, light shielding, and protection. The sealing method is not particularly limited, and for example, a method of applying the resin composition in a liquid phase to the electronic element, a method of burying the electronic element in the resin composition through pressurization, and a method of disposing the electronic element in a recessed portion of an embossed resin composition and attaching the resultant to a flat resin composition sheet may be used. As the resin used for sealing, the resin composition of this exemplary embodiment described above may be used, and a general resin composition which is typically used for sealing in the electronic device field may also be used in a range in which the effect of the invention is not significantly impaired.

The structural member for electronic devices of this exemplary embodiment can be obtained, for example, by directly applying the resin composition obtained as described above to the electronic element described above, by heating and drying the resin composition to vaporize the solvent and achieve a semi-cured state and thereafter disposing the electronic element, or by allowing a semi-cured resin composition to come into close contact with the electronic element through transfer.

Furthermore, a filler may also be added to the resin composition in a range in which the stretch resistance of the structural member for electronic devices is not impaired. The type of the filler is not particularly limited, and examples thereof include an inorganic material or an elastomer selected for the purpose of enhancing thermal conductivity, low thermal expansion, antistatic performance, conductive properties, breaking strength, and the like.

Moreover, the structural member for electronic devices of this exemplary embodiment may further include a conductive portion such as a wire or an electrode for the purpose of electrical connection or signal communication between the electronic element described above and the resin composition described above, or between the structural member for electronic devices and an external electronic member or a communication object. A method of forming the wire is not particularly limited, and for example, a well-known method such as ink jet printing, screen printing, stencil printing, intaglio printing, letterpress printing, or planographic printing using conductive paste or ink may be used. In addition, a method of forming the electrode is not particularly limited, and a method of forming an electrode by applying or printing a liquid dispersion such as carbon nanotubes, metal nanowires, or conductive polymers, a method of depositing metal or metal oxides, a method of selectively transferring a conductive layer, or the like may be employed.

The shape of the structure of this exemplary embodiment is not particularly limited, and for example, may be a sheet-like configuration in which the electronic element is included or mounted in the resin composition of this exemplary embodiment as a resin sheet.

In addition, a structure which is obtained by forming the resin composition described above into a film and allowing the electronic element to be disposed in or to come into close contact with the film by transfer is preferable. It is thought that when the structure has such a form, an electronic member or device which can be simply mounted and has excellent breaking resistance can be realized. The method of forming the film is not particularly limited, and for example, the resin composition of this exemplary embodiment may be formed into a film shape by using a generally used coater such as a spin coater, bar coater, or comma coater.

The structure of this exemplary embodiment obtained as described above can be used as a member for electronics in various uses. Particularly, since the resin composition included in the structure of this exemplary embodiment is flexible, has excellent stress relaxation properties and restoration properties, and thus has both stretchability and flexibility, the structure is very appropriate as a structure used in, for example, bendable electronic paper, an organic EL display, a solar cell, an RFID, a pressure sensor, or the like.

[6] CONCLUSIONS

This specification discloses techniques in various aspects as described above, and the main techniques are collected as follows.

An aspect of the present invention is a structural member for electronic devices which includes a resin composition that is elastically deformable and has low residual strain and stress relaxation properties, and an electronic element. As described above, since high stress relaxation properties during tension and excellent restoration properties after extension are compatible with each other, peeling between members or breaking of members, which may occur in electronic members according to the related art, can be suppressed by the material which is flexible and has excellent stress relaxation properties. Furthermore, the structure according to the present invention can be returned to its original shape when being released from deformation or the like.

Moreover, by using such an excellent material in a portion or the entirety of the structure, an electronic device which can follow a free-form surface or can cope with significant deformation can be realized. In addition, since the compatibility between high stress relaxation properties and restoration properties is provided, the structure can be applied to various technology fields such as optical fields, information fields, adhesion fields, and medical fields.

In addition, it is preferable that the stress relaxation ratio R and the residual strain ratio α measured by the extension-restoration test described above in the resin composition used in the structure satisfy the following expression:

$20\% \leq R \leq 95\%$, and $0\% \leq \alpha \leq 3\%$.

In this configuration, a material which has both high stress relaxation properties during tension and extremely excellent restoration properties after extension can be more reliably obtained.

Furthermore, it is preferable that in a case where the resin composition is elongated in a range of 15% to 20% in the extension-restoration test, the slopes of the changes in tensile force during restoration and during extension with respect to strain amount satisfy slope during restoration/slope during extension≤0.95.

It is thought that in this configuration, a material having more excellent stress relaxation properties can be obtained.

In addition, it is preferable that the stress value of the resin composition measured during maximum extension (during 25% extension) in the extension-restoration test becomes the maximum stress value, and in a case where measurement is started simultaneously with the end of the extension process in the above-described stress relaxation property test, the tensile force $F_{B0}$ immediately after the end of the extension process and a tensile force $F_B(t30)$ when 30 minutes has elapsed after the end of the extension process satisfy the following expression:

$$0.1 \leq F_B(t30))/F_{B0} \leq 0.7.$$

In this configuration, a material having stress relaxation properties and extremely excellent restoration properties after extension can be more reliably obtained.

Furthermore, it is preferable that even when the test is repeatedly performed by using the resin composition two or more times, a behavior in which the above-described expressions are satisfied is exhibited. Accordingly, a material having more excellent restoration properties can be obtained.

Furthermore, it is preferable that the resin composition contains at least a thermosetting resin and a curing agent thereof. Accordingly, a material having stress relaxation properties and extremely excellent restoration properties after extension can be more reliably obtained.

In addition, it is preferable that the thermosetting resin is an epoxy resin. Accordingly, higher stress relaxation properties and higher restoration properties can be compatible with each other, and thus heat resistance and toughness can be added.

It is preferable that in the structural member for electronic devices, the resin composition has a film form. When such a film is used in the structural member for electronic devices, the structure can be simply produced by a widely used method such as transfer or molding using the electronic element and the resin composition.

Furthermore, it is preferable that the structure has the conductive portion which connects the electronic element to the resin composition. Accordingly, electric communication between elements or formation of transmission and reception wires such as an antenna can be achieved, and the wire portion can also be reinforced by resins.

In addition, it is preferable that the structure has a conductive portion which is electrically connected to the structure from the outside. Accordingly, power can be supplied to the electronic element from the outside, or interlayer connection can be achieved by disposing the conductive portion between other package components and a mounted board.

Furthermore, it is preferable that in the structure, a portion of the electronic element comes into close contact with the resin composition. Accordingly, stress applied to the mounted electronic element from the outside can be efficiently relaxed, resulting in the enhancement of reliability.

In addition, it is preferable that in the structure, the entirety of the electronic element is covered with the resin composition. Accordingly, protection performance of the electronic element is enhanced. For example, moisture resistance, heat resistance, weather resistance, oxidation resistance, impact resistance, and the like can be enhanced.

The structure according to the present invention described above is a structure which includes, as constituent components, the electronic element and the resin composition that is elastically deformable and has low residual strain and stress relaxation properties. As described above, since the resin composition which allows high stress relaxation properties during tension and excellent restoration properties after extension to be compatible with each other is included as the constituent component, it is possible to provide a structure which is less likely to be broken even during stretching and thus has excellent reliability.

The present invention can provide a structure for an electronic element, which is less likely to be broken even during stretching and thus has excellent reliability, and can enhance the reliability of the electronic element.

What is claimed is:
1. A structure for electronic structural member for electronic devices comprising:
   a resin composition; and
   an electronic element of which a portion comes into close contact with the resin composition,
   wherein, in the resin composition, stress generated due to any deformation caused by given strain decreases with time, and the resin composition recovers a shape before the deformation when the stress becomes approximately 0,
   wherein the resin composition contains at least (A) a polyrotaxane, (B) an epoxy resin, and (C) a curing agent, and
   wherein the proportion of epoxy resin in 30 to 50 parts by mass with respect to 100 parts by mass of polyrotaxane, epoxy resin, and curing agent.
2. The structural member for electronic devices of claim 1,
   wherein, in constituent components, a stress relaxation ratio (R) and a residual strain ratio ($\alpha$) measured by an extension-restoration test described below satisfy the following expressions:

$$20\% \leq R \leq 95\%, \text{ and}$$

$$0\% \leq \alpha \leq 3\%$$

[Extension-Restoration Test]
   A piece of a cured product of the resin composition (thickness: 50 µm, sample shape: dumbbell specimen No. 6 (measurement portion width: 4 mm, parallel portion length: 25 mm)) is used, an extension process is performed and thereafter a restoration process is performed by a tensile and compression testing machine based on ISO 3384 under the following conditions, and a stress relaxation ratio (R) and a residual strain ratio ($\alpha$) are calculated according to the following calculation method:
   Extension Process Conditions:
      in order to eliminate deflection generated when the test piece is attached to a clamp, deflection correction being carried out at a force of 0.05 N or lower,
      Testing rate: 25 mm/min from 0% to 25% extension
      Temperature condition: 23° C.
      Extension and holding conditions: a holding time of 5 minutes at 25% extension
   Restoration process Conditions:
      Testing rate: 0.1 mm/min until a tensile force becomes 0±0.05 N
      Temperature condition: 23° C.
      Stress relaxation ratio calculation method: a tensile force at the time of the end of the extension process is measured and is referred to as an initial tensile force ($F_{A0}$); thereafter, a strain amount is held under the above-described extension and holding conditions and the tensile force is measured after 5 minutes; this is referred to as ($F_A(t5)$); and the stress relaxation ratio (R) is calculated by the following expression formula:

$$R = \frac{F_{AO} - F_A(t5)}{F_{AO}} \times 100 \qquad \text{[Expression formula 1]}$$

Residual strain ratio calculation method: the strain amount is measured at a point when the tensile force becomes 0±0.05 N in the restoration process, and this amount is referred to as residual strain ratio (α).

3. The structural member for electronic devices of claim 2,
wherein, in a case where the resin composition is elongated in a range of 15% to 20% in the extension-restoration test, slopes of changes in tensile force during restoration and during extension with respect to strain amount satisfy the following expression:

slope during restoration/slope during extension≤0.95.

4. The structural member for electronic devices of claim 2,
wherein the resin composition satisfies the following conditions:
a stress value measured during maximum extension (during 25% extension) in the extension-restoration test becomes the maximum stress value, and
in a case where measurement is started simultaneously with the end of the extension process in a stress relaxation property test below, a tensile force ($F_{B0}$) immediately after the end of the extension process and a tensile force ($F_B(t30)$) when 30 minutes has elapsed after the end of the extension process satisfy the following expression:

0.1≤$F_B(t30)$)/$F_{B0}$≤0.7

[Stress Relaxation Property Test]
A piece of a cured product of the resin composition (thickness: 50 μm, sample shape: dumbbell specimen No. 6 (measurement portion width: 4 mm, parallel portion length: 25 mm)) is used, an extension process is performed by a tensile and compression testing machine based on ISO 3384 under the following conditions, and a tensile force at the time of the end of extension is measured and is referred to as an initial tensile force ($F_{B0}$); thereafter, a tensile force ($F_B(t30)$) after 30 minutes is measured;
Extension Process Conditions:
In order to remove deflection that occurs when the test piece is attached to a gripper, deflection correction is performed; and the deflection correction is performed with a force of 0.05 N or lower;
Testing rate: 25 mm/min until 50% extension
Temperature condition: 23° C.
Extension and holding conditions: a holding time of 30 minutes at 50% extension.

5. The structural member for electronic devices of claim 2,
wherein the resin composition satisfies the conditions described in (Expression formulae 1) even when the test is repeatedly performed two or more times.

6. The structural member for electronic devices of claim 2,
wherein the resin composition has a film form.

7. The structural member for electronic devices of claim 2, further comprising:
a first conductive portion which connects the electronic element to the resin composition.

8. The structural member for electronic devices of claim 2, further comprising:
a second conductive portion which is electrically connected to the structural member from an electrical path not originating from between the electronic element and resin composition comprising the structural member.

9. The structural member for electronic devices of claim 2,
wherein the electronic element is entirely covered with the resin composition.

10. The structural member for electronic devices of claim 2,
wherein the epoxy resin contains 2 or more epoxy groups and 3 methyl groups per molecule and has a molecular weight of 500 or higher.

11. The structural member for electronic devices of claim 1,
wherein the resin composition has a film form.

12. The structural member for electronic devices of claim 1, further comprising:
a first conductive portion which connects the electronic element to the resin composition.

13. The structural member for electronic devices of claim 1, further comprising:
a second conductive portion which is electrically connected to the structural member from any electrical path not originating from between the electronic element and resin composition comprising the structural member.

14. The structural member for electronic devices of claim 1,
wherein the electronic element is entirely covered with the resin composition.

* * * * *